United States Patent [19]

Suzuki et al.

[11] 4,269,493
[45] May 26, 1981

[54] ELECTROMAGNETIC CAMERA SHUTTER CONTROL DEVICE

[75] Inventors: Ryoichi Suzuki, Kawasaki; Takao Kinoshita, Tokyo; Yukio Ogawa, Kawasaki; Takashi Uchiyama, Yokohama, all of Japan

[73] Assignee: Canon Kabushiki Kaisha, Tokyo, Japan

[21] Appl. No.: 14,621

[22] Filed: Feb. 22, 1979

[30] Foreign Application Priority Data

Feb. 23, 1978 [JP] Japan ................................ 53/20117

[51] Int. Cl.³ .................... G03B 9/00; H02K 33/02; H02K 41/02; H01F 7/16
[52] U.S. Cl. ................................ 354/51; 354/234; 354/235; 310/13; 310/27; 318/135; 335/222; 335/262; 335/263
[58] Field of Search ............ 354/234, 235, 50, 51, 354/288; 335/219, 222, 223, 262, 263, 282; 310/13, 27; 318/135

[56] References Cited

U.S. PATENT DOCUMENTS

| 3,786,383 | 1/1974 | Ludwig et al. | 335/222 X |
| 4,112,450 | 9/1978 | Kondo | 354/235 |
| 4,171,897 | 10/1979 | Fujita et al. | 354/234 |

FOREIGN PATENT DOCUMENTS

| 2209913 | 9/1973 | Fed. Rep. of Germany | 354/235 |
| 45-29275 | 9/1970 | Japan | 354/235 |

*Primary Examiner*—L. T. Hix
*Assistant Examiner*—William B. Perkey
*Attorney, Agent, or Firm*—Toren, McGeady and Stanger

[57] ABSTRACT

An electromagnetic shutter control device for controlling opening and closing operation of the shutter of a compact folding camera includes a bobbin having a magnetic winding therearound, a stationary permanent magnet over which the bobbin fits for magnetically actuated movement in a longitudinal direction, and guide elements for constraining movement of the bobbin in the longitudinal direction only. The permanent magnet acts to maintain the bobbin in a normal position at the terminal end of its movement coinciding with the closed position of the shutter. Energization of the magnetic winding actuates the bobbin in order to thereby actuate the shutter to the open position. The bobbin and the permanent magnet are particularly formed with a rectangular configuration so that the electromagnetic control device may be shaped to enhance and facilitate the compactness of a camera with which it is utilized.

9 Claims, 19 Drawing Figures

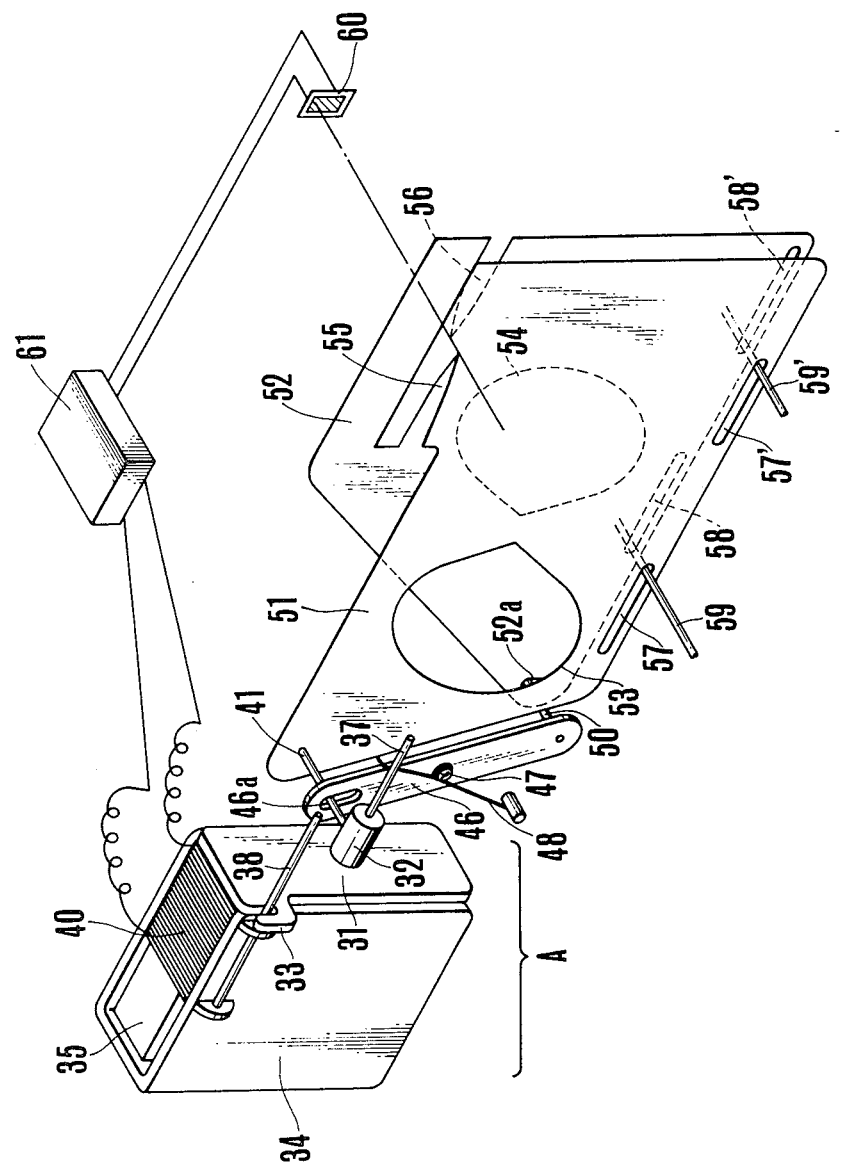

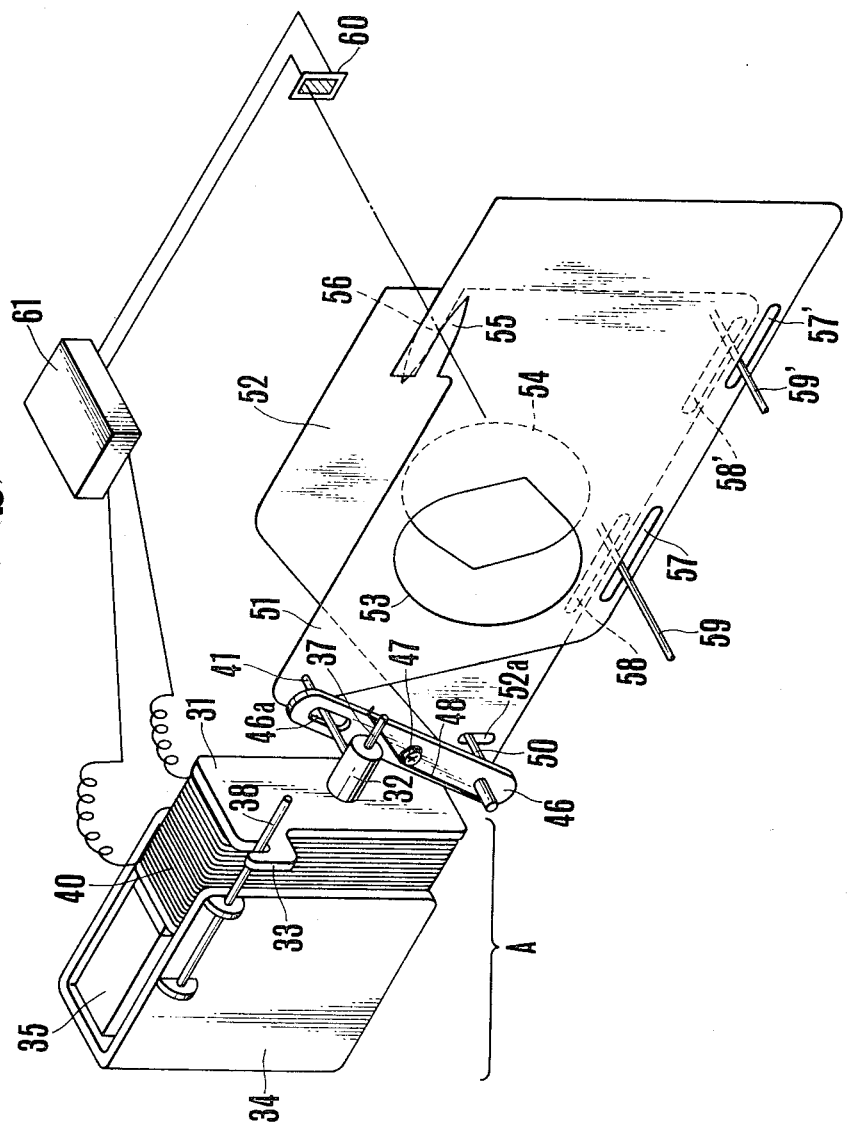

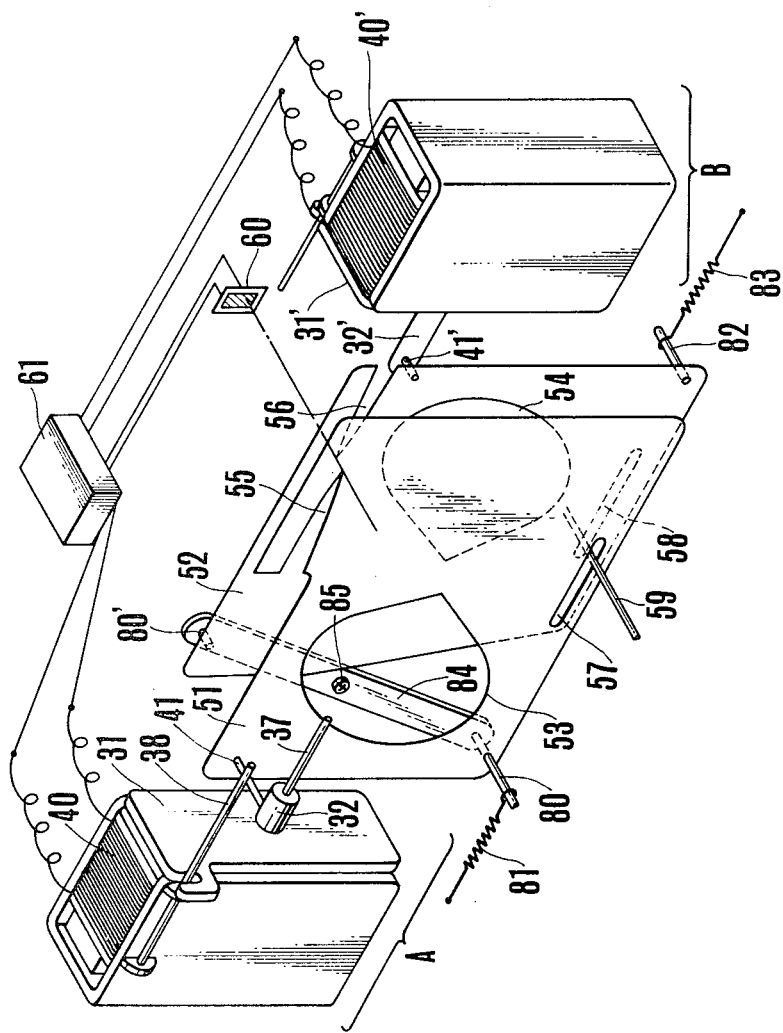

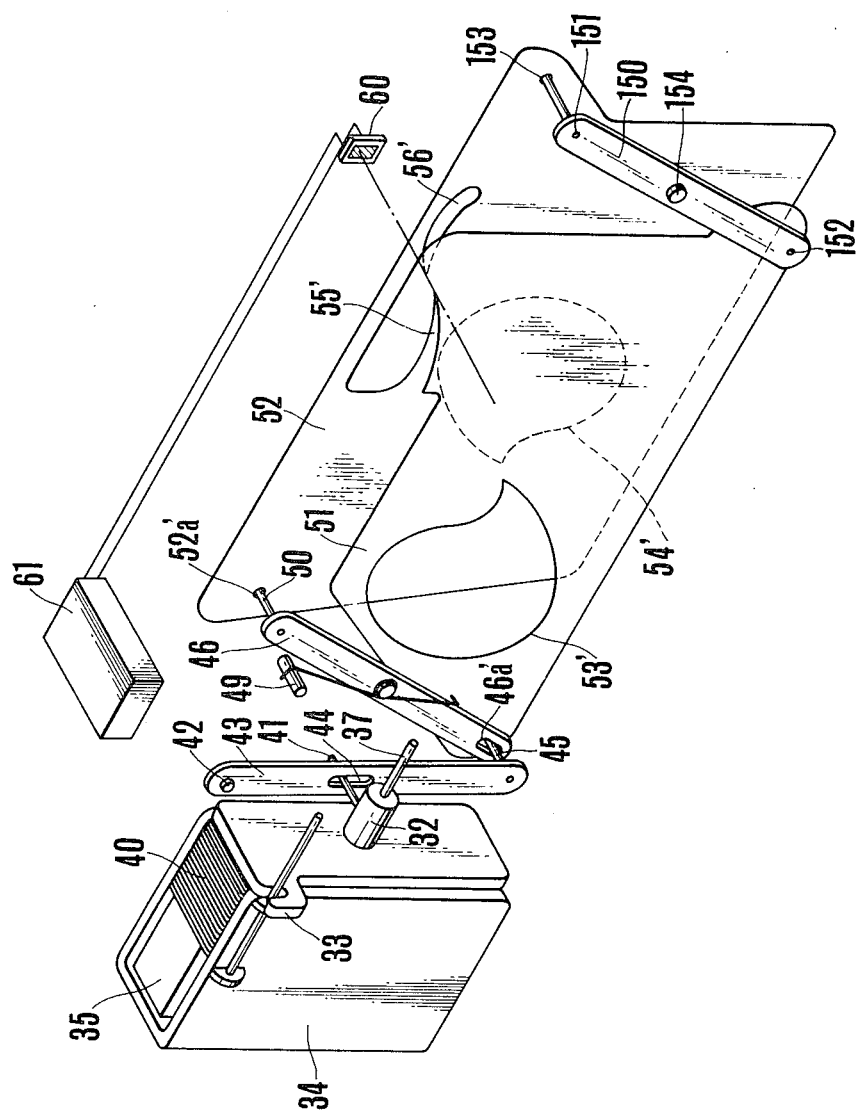

ELECTROMAGNETIC CAMERA SHUTTER CONTROL DEVICE

BACKGROUND OF THE INVENTION

The present invention relates generally to photographic cameras and more particularly to an electromagnetic control device for driving the shutter of a camera.

Most known cameras employ spring operated lens shutters or focal plane shutters. Recently, an increasing number of electronic devices have found utilization in cameras particularly for the purpose of reducing the number of mechanical components necessary in forming the camera structure. In this course of development there has come into use a so-called "electrical shutter". In such a shutter, although the mechanical type of shutter timing device is replaced by an electrical circuit and magnetic winding device, the shutter blade drive mechanism has remained unchanged and utilization is still made of tensioned springs as the power source for driving the blades. Accordingly, a surveillance of the prior art will show that conventional shutter arrangements have not been sufficiently simplified and still maintain some degree of complexity in their structure and operation.

It has been known to provide electromagnetic control devices for actuating the shutter mechanism of a camera wherein a hollow bobbin having a magnetic winding thereon is formed as the movable part of a magnetic actuating assembly. A generally cylindrically shaped hollow yoke having a permanent magnet fixedly secured thereto is arranged in magnetically operable relationship relative to the bobbin. Generally, such a permanent magnet will have a pole piece at the top thereof with a guide shaft extending longitudinally from the center of the upper area of the pole piece. The internal surface of the yoke encloses a space extending about the external surface of the permanent magnet wherein magnetic flux is developed and within which the bobbin may be guided for axial movement in developing the actuating forces necessary to operate the shutter. As will be apparent, when the magnetic winding of the bobbin is energized a magnetic force is exerted which will interact with the magnetic force of the permanent magnet so that the bobbin will be moved in an appropriate direction. This magnetic force is utilized to control the opening and closing operation of the shutter. Generally, magnetic devices of this type will provide guide means in the form of a guide hole in the bobbin and a guide shaft in the yoke operating to effect guided movement of the bobbin relative to the yoke.

In order to enable the force of the magnetic actuating device to be balanced by the biasing force of a drive spring, conventional electromagnetic control devices must be formed with increased dimensions. Because of the generally annular construction of the armature, it is from a practical point of view very difficult to assure satisfactory efficiency of the electromagnetic control device within the small space available in applications such as a compact camera. Particularly, with a lens shutter which requires that the control device be positioned adjacent the photo-taking lens, problems of this nature can become quite serious.

Accordingly, the present invention is directed to the task of eliminating many of the conventional drawbacks in prior art systems and to providing an electronically operated magnetic control device for a lens shutter which is adapted for incorporation in a compact camera.

A further task to which the invention is directed is to enable the control device to be cooperatively adapted with the shape of the camera.

Furthermore, the invention is directed toward providing an electromagnetic control device having guide means which will make it possible to assure satisfactory operation of the shutter drive means.

SUMMARY OF THE INVENTION

Briefly, the present invention may be described as an electromagnetic control device for operating the shutter of a camera comprising a hollow yoke of rectangular configuration having a permanent magnet fixedly mounted therein with a pole piece being fixedly mounted on the permanent magnet. An air gap is defined between the internal surface of the yoke and the pole piece and a magnetic flux is produced in the air gap by the permanent magnet. A hollow bobbin having a rectangular configuration is located for operative movement within the air gap. The bobbin is formed with a coil which, when energized, operates to effect actuating movement of said bobbin by the interaction with the magnetic flux formed in the air gap. First guide means arranged between the pole piece and the bobbin and second guide means arranged between the yoke and the bobbin operate to guide the movement of the bobbin in order thereby to enable appropriate actuation of the shutter mechanism.

The various features of novelty which characterize the invention are pointed out with particularity in the claims appexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIGS. 5a and 5b are perspective views showing a second embodiment of an electromagnetically driven shutter mechanism in accordance with the present invention in two different operating modes;

FIG. 6 is a perspective view of a third embodiment of the invention employing two electromagnetic control devices such as that shown in FIG. 2b;

FIGS. 7, 8 and 9 are perspective views showing three additional examples of shutter drive mechanisms associated with correspondingly modified electromagnetic control devices;

DETAILED DESCRIPTION OF PREFERRED EMBODIMENTS

Figure 1:
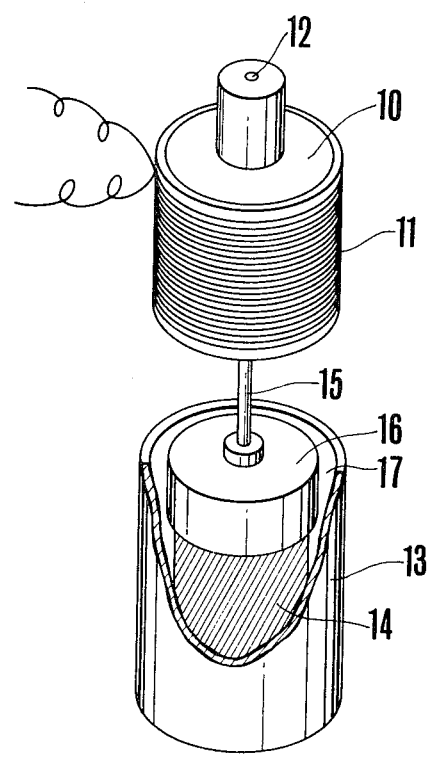
FIG. 1 is a perspective view of a conventional round electromagnetic control device.

An example of the type of device known from the prior art to which the present invention relates is depicted in FIG. 1. In the known device, it has been common to provide an electromagnetic control device wherein a hollow bobbin 10 with a magnetic winding 11 thereon is provided with a guide hole 12. A cylindrical hollow yoke 13 made of soft magnetic iron contains a cylindrical permanent magnet 14 which is fixedly secured thereto. On the top end of the permanent magnet 14, a pole piece 16 is provided and a guide shaft 15 extends longitudinallay from the center of the upper portion of the pole piece 16. An air gap or space 17 is defined between the internal surface of the yoke 13 and the external surface of the permanent magnet 14 with a magnetic flux being developed within the air gap 17. The bobbin is inserted into the air gap 17 with the guide shaft 15 extending through the guide hole 12 in order to guide longitudinal movement of the bobbin relative to the yoke 13. When the magnetic winding 11 is energized, a magnetic force is exerted which will interact with the magnetic flux developed by the permanent magnet 14 within the air gap 17 and as a result of this the bobbin 10 will be urged to move in an upward or downward direction. Thus, the magnetic force developed by the device is utilized in order to control opening and closing of a shutter mechanism which may be suitably attached in a manner known per se with the bobbin 10.

Figure 2A:
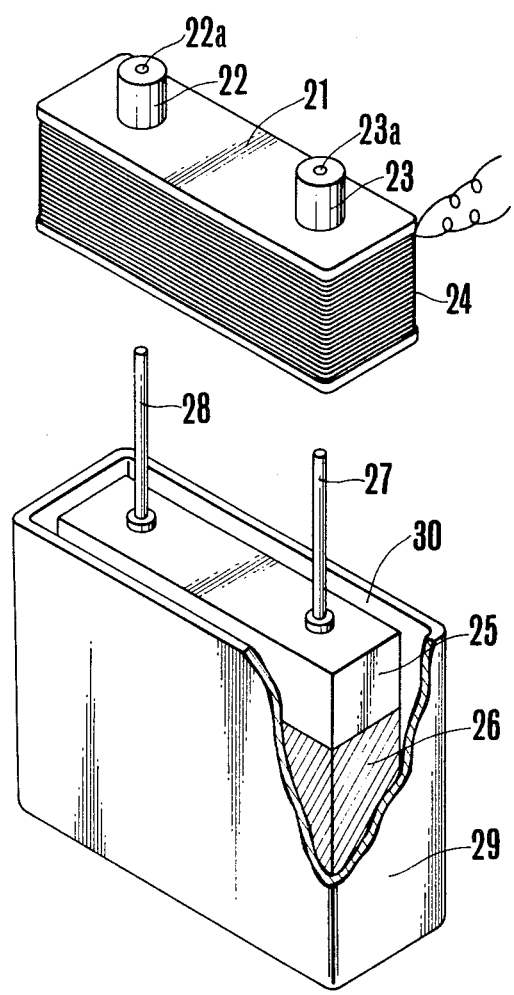
FIGS. 2a–2a are exploded perspective views depicting five examples of electromagnetic control devices in accordance with the present invention.

Several examples of structural configurations of electromagnetic control devices made in accordance with the present invention are depicted in FIGS. 2a–2e. In the first example of embodiments formed in accordance with the present invention as shown in FIG. 2a, an electromagnetic control device is depicted as comprising an armature which is configured in the form of a rectangular hollow bobbin 21 with two cylindrical projections 22 and 23 extending therefrom. The projections 22 and 23 are provided with guide holes 22a and 23a at central portions thereof, respectively, and a magnetic winding 24 is provided around the bobbin 21. A pole piece 25 also of rectangular configuration is fixedly mounted on the upper side of a stationary permanent magnet 26 which, again, is rectangularly shaped. Two guide shafts 27 and 28 extend upwardly from the pole piece 25 and a box shaped yoke 29 containing the permanent magnet 26 has the bottom portion of the magnet 26 secured thereto. An air gap 30 is formed between the combined pole piece 25 and permanent magnet 26 and the yoke 29, with a magnetic flux being produced by the permanent magnet 26 within the air gap 30.

As previously described in connection with FIG. 1, the bobbin 21 which acts as an armature will be axially moved relative to the permanent magnet 26 and the pole piece 25 by energization of the winding 24 with the guide shafts 27 and 28 guiding movement of the armature 21 by engagement within the guide holes 22a and 23a, respectively.

Figure 2B:
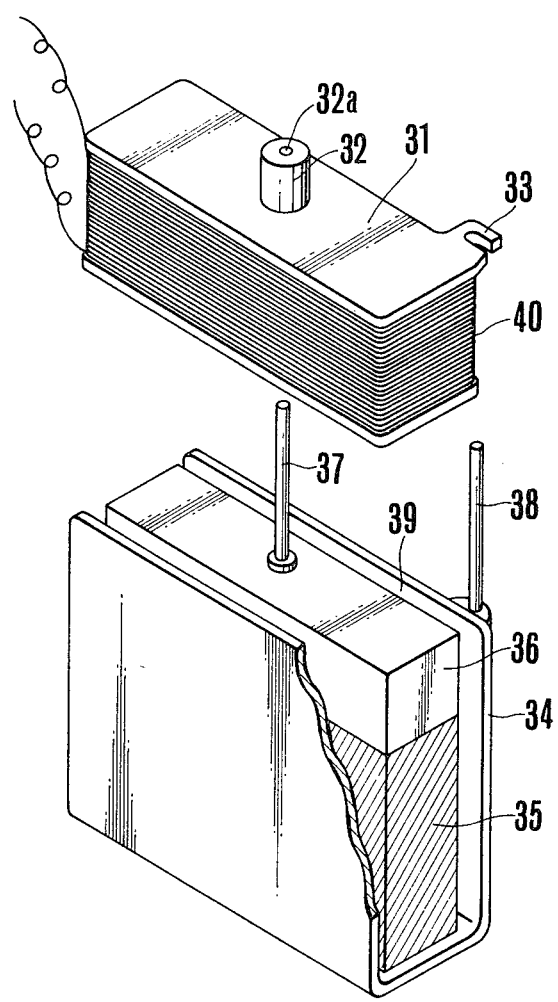

A second example of an electromagnetic control device in accordance with the present invention is shown in FIG. 2b. A hollow bobbin 31 of rectangular configuration having only one cylindrical projection 32 located at the center of the upper area thereof is formed with a guide hole 32a extending through the projection 32 and with a guide slot 33 formed in a corner of the upper panel. A permanent magnet 35 having the same rectangular configuration and being constructed similarly to that previously described with reference to FIG. 2a, is formed with a pole piece 36 fixedly mounted thereon, with a shaft 37 being located to extend upwardly from the upper face of the pole piece 36. The shaft 37 is arranged to pass through the guide hole 32a when the bobbin 31 with the magnetic winding 40 thereon is inserted into an air gap 39 between the combined permanent magnet and pole piece, 35, 36 and the yoke 34. It will be noted from FIG. 2b that the yoke 34 may be formed in a U-shaped configuration and that a second guide shaft 38 may be provided to extend parallel to the shaft 37, with the shaft 38 being positioned in alignment with the guide slot 33.

In both of the devices depicted in FIGS. 2a and 2b, the basic principal of exerting a magnetic force in order to move the armature or bobbin 21, 31 between its two end positions is basically the same as that involved with the conventional device depicted in FIG. 1. After the bobbin 21, 31 is inserted into the air gap 30, 39, and with the magnetic winding 24, 40 being energized, an upward force is exerted on the bobbin 21, 31. The guide shafts 28, 27 or 37, 38 function to prevent the bobbin from coming into contact with the permanent magnet 26, 35 as the bobbin moves parallel to the permanent magnet.

Figure 2C:
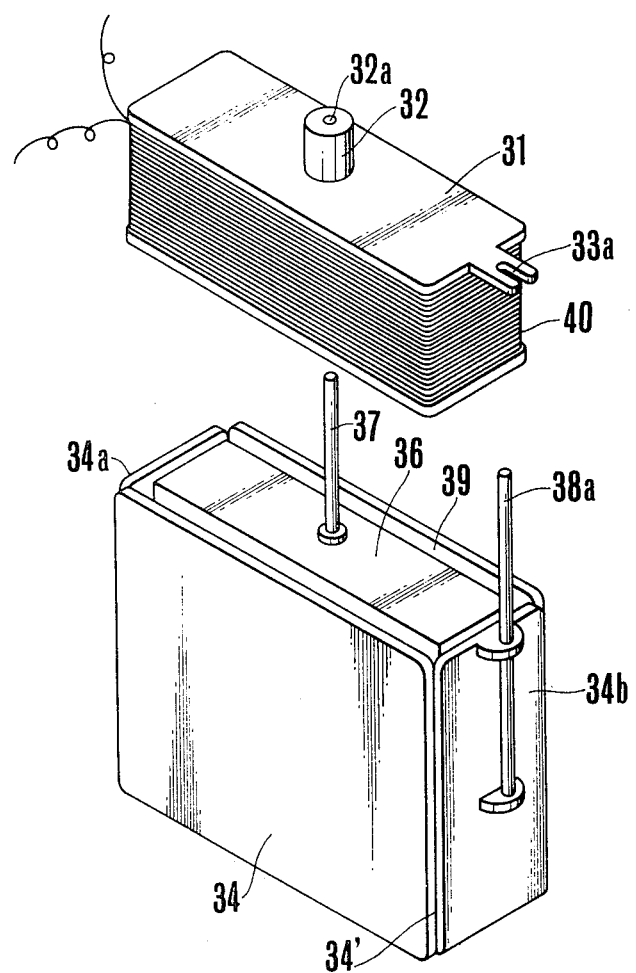

A third example of a device structured in accordance with the present invention is shown in FIG. 2c which represents an electromagnetic device featuring some improvements over the structure of FIG. 2b. The device of FIG. 2c is generally similar to the device depicted in FIG. 2b except that the U-shaped yoke 34 is formed with open sides where end walls 34a and 34b are located so that magnetic flux formed between the end walls 34a and 34b of the yoke 34 and the pole piece 36 and permanent magnet 35 contribute to an increase in the force output of the device. Furthermore, bobbin rotation is prevented by a guide shaft 38a whose position is changed from that of the shaft 38 of FIG. 2b, with the shaft 38a being located on one of the end walls, specifically the wall 34b shown in FIG. 2c. Thus, it becomes possible to reduce the overall thickness of the device. An elongated slot 33a is formed in a longitudinal projection of the upper panel of the bobbin 31 and when this slot is engaged by the shaft 38a there will be prevented a rotation of the bobbin 31 about the shaft 37. In this example, although there are formed gaps 34' between the edges of the yoke 34 and the end walls 34a and 34b, since the magnetic lines of flux created by the permanent magnet 35 will extend parallel with the shaft 38a through the body of the yoke, the gaps 34' will not increase magnetic resistance generated against the permanent magnet 35.

Figure 2D:
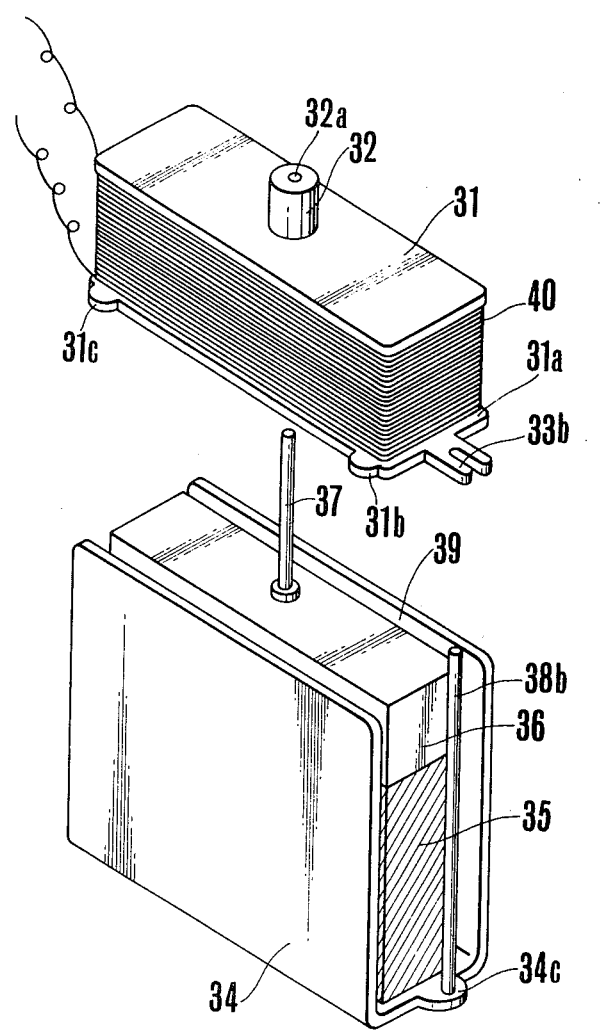

FIG. 2d shows a fourth example of an electromagnetic control device which represents some improvement over that of FIG. 2b. The device of FIG. 2d is generally similar to that of FIG. 2b with some differences. A guide shaft 38b, whose function is to prevent rotation of the bobbin 31 about the shaft 37, is positioned adjacent an open side of the yoke 34 and is fixedly mounted on a tab 34c of the yoke 34. An elongated slot 33b is formed in a projection on the lower edge of the bobbin 31. As a result of the location of the slot 34b, it is possible to decrease the length of the guide shaft 38b. The lower edge of the bobbin 31 is provided with four lugs 31a–31d at respective corners thereof with these lugs acting in sliding abutment against the internal surface of the yoke 34 to prevent the bobbin 31 from scraping or coming into contact with the permanent magnet 35 during its operative movement relative thereto.

Figure 2E:
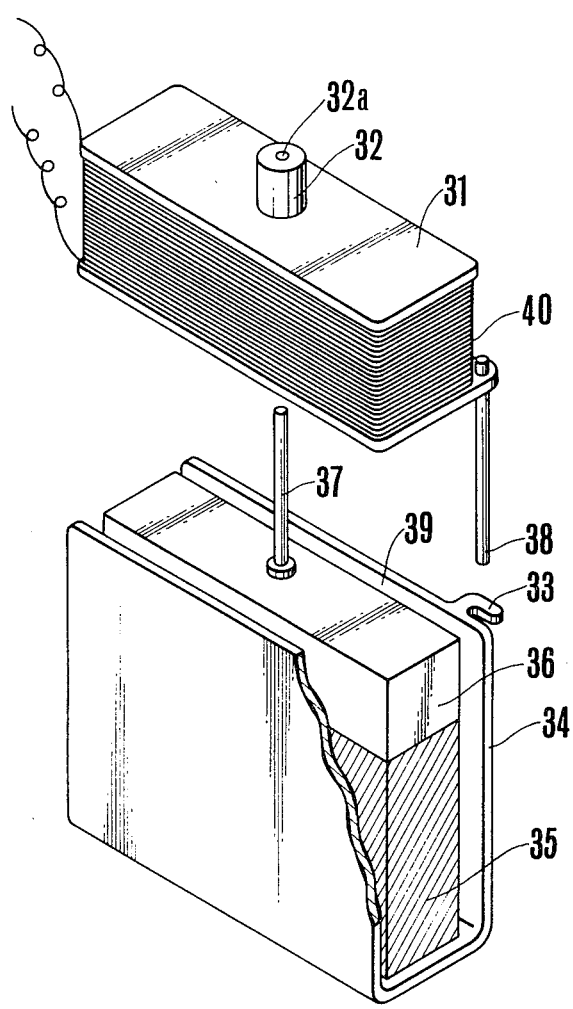

A fifth example of an electromagnet control device in accordance with the present invention, which also features some improvements over the construction configured as in FIG. 2b, is shown is FIG. 2e. Again, the device of FIG. 2e is basically similar to that of FIG. 2b. In FIG. 2e, a guide shaft 38 has its position changed so that it is located upon the bobbin 31 with a slot 33 being located on the yoke 34. Again, operative movement of the bobbin 31 will be guided by the shafts 37 and 38 engaging, respectively, in the opening 32a and the slot 33.

The electromagnetic control devices depicted in FIG. 2a–2e are, because of their generally rectangular, flat configuration, easy to incorporate into a camera which requires that space limitations be observed. Because of the rectangular construction of the devices, highly advantageous space factor characteristics are developed and the devices may be operatively assimilated into cameras with relative facility. Since a pole piece such as the pole pieces 25, 36 of FIGS. 2a–2e, operates to increase the density of magnetic flux in the air gaps 30, 39, it may be omitted from the structure of the device as may be desired from the point of view of the design of the overall mechanism. If the pole piece is omitted, the guide shaft 27, 28, 39 may be directly attached to the permanent magnet 26, 35.

Figure 3:
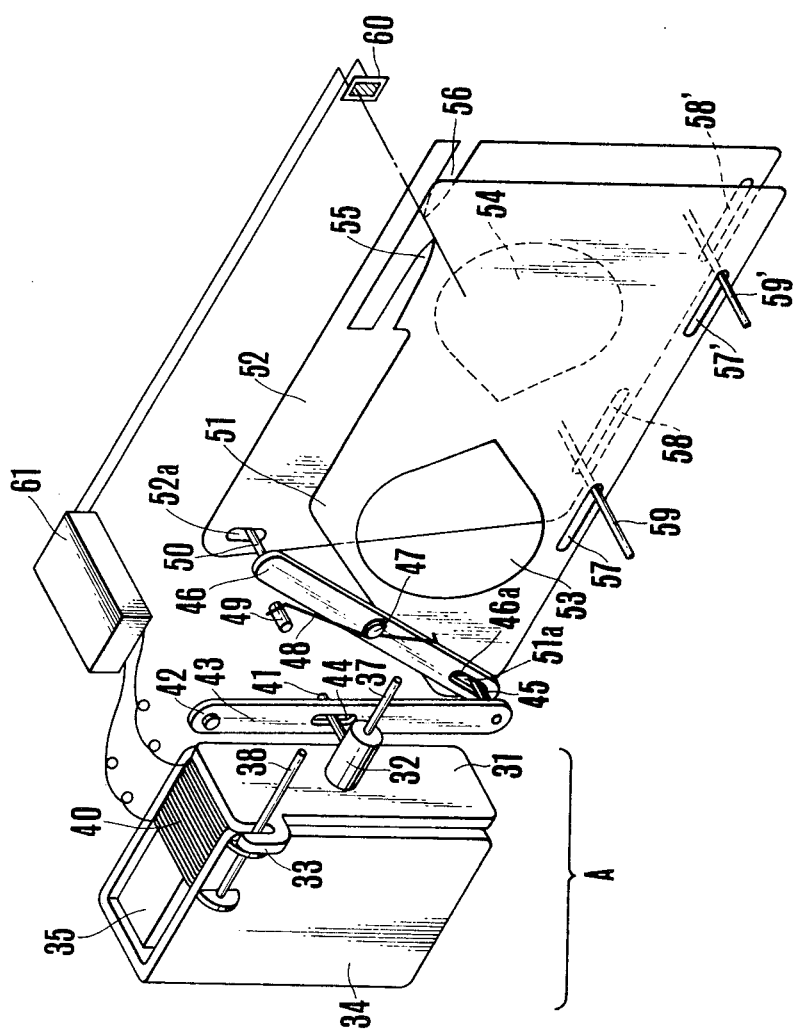
FIG. 3 is a prospective view of a first embodiment of an electromagnetically driven shutter mechanism in accordance with the present invention utilizing the device of FIG. 2b.

In FIG. 3 there is depicted a first embodiment of the present invention wherein the electromagnetic control device is utilized in conjunction with a shutter mechanism to actuate the shutter. The embodiment of FIG. 3 utilizes an electromagnetic control device such as that depicted in FIG. 2b, and this device is indicated at A with like reference numerals being employed to denote similar parts to those shown in FIG. 2b.

A shutter mechanism includes a pair of planar opaque blades 51 and 52 each provided with an exposure orifice 53 and 54, respectively. The blades 51, 52 are mounted in tracks (not shown) so as to be movable within planes perpendicular to the optical axis of a photo-taking lens of the camera (not shown). Positioned between the electromagnetic control device A and the shutter blades 51, 52 is a motion transmitting mechanism which comprises a first lever 43 rotatably mounted on a pivot pin 42 and having a slot 44 formed at the center of the length thereof. A pin 41 extending from the cylindrical guide slider 32 of the armature 31 engages within the slot 44. A second lever 46 is pivotally mounted on a fulcrum pin 47 and is formed with a slot 46a at one end thereof with a pin 45 located at the free end of the first lever 43 extending through and outwardly beyond the slot 46a of the lever 46. The pin 45 also extends into a slot 51a formed in the front shutter blade 51. The opposite end of the lever 46 has thereon a pin 50 which extends into engagement with a slot 52a formed in the rear shutter blade 52. A spring 48 urges the lever 46 for movement in a clockwise direction about the fulcrum 47 in order to insure that the exposure orifices 53 and 54 will be completely out of alignment with each other when in the closed position.

When the magnetic winding 40 is energized by current flow therethrough under the control of an exposure control circuit 61, which operates to effect current flow in the appropriate direction through the winding 40, the bobbin 31 will be rapidly driven to move in a direction toward the right as viewed in FIG. 3, with the movement being guided in the interengagements of the slider-shaft guide 32, 37 and the slot-shaft guide 33, 38. Such linear motion of the bobbin 31 will be transmitted to the lever 43 in a manner to effect counterclockwise movement thereof about the pivot 42 by means of the pin-and-slot connection 41, 44. This motion will be then transmitted in order to move the front shutter blade 51 to the right by means of the pin-and-slot connection 45, 51a, with the movement of the shutter blade being guided by pin-and-slot engagements 59, 57 and 59', 57'. Additionally, the rear shutter blade 52 will be caused to move to the left by engagement therewith by the lever 46 which operates against the force of the spring 48, with movement of the shutter blade 52 also being guided by the pins 59, 59' engaging in respective slots 58, 58'.

Thus, the front and rear blades 51 and 52 will reach their respective end positions whereupon the orifices 53 and 54 will be aligned with each other in order to effect appropriate exposure with an exposure aperture (not shown) also being brought into alignment.

In the operation of the shutter device of FIG. 3, as the opening developed by the overlapping orifices 53 and 54 is enlarged, the size of a light-metering aperture defined by cutouts 55 and 56 provided in the shutter blades 51 and 52 will be increased with the result that an increased amount of light will be caused to be received by a photosensitive element 60. When the amount of this light reaches a predetermined level, current flowing through the magnetic winding 40 will have its direction reversed so that the bobbin 31 will be retracted to its initial position, which is illustrated in FIG. 3. Thus, the shutter blades 51 and 52 will, as will be apparent from FIG. 3, be moved in the opposite directions to terminate the exposure operation. At this time, the spring 48 will contribute to an increase in the driving force returning the shutter blades to their initial position.

It is to be understood that the electromagnetic control device A is conformed to the shutter mechanism in order to facilitate incorporation of the electromagnetically driven shutter within an instant type camera which is the type of camera involving a self-developing film system. As a result, there may be effected an increase in the space factor as compared with a conventional type of round electromagnetic control device such as that depicted in FIG. 1. Since an instant camera generally utilizes a larger film format as, for example, compared to a 35 mm camera, it is required that the structure of the instant camera be as compact as possible and as small as possible in order to facilitate the portability thereof. An example of a camera within which the present invention may be utilized is depicted in FIGS. 4a and 4b.

Figure 4A:
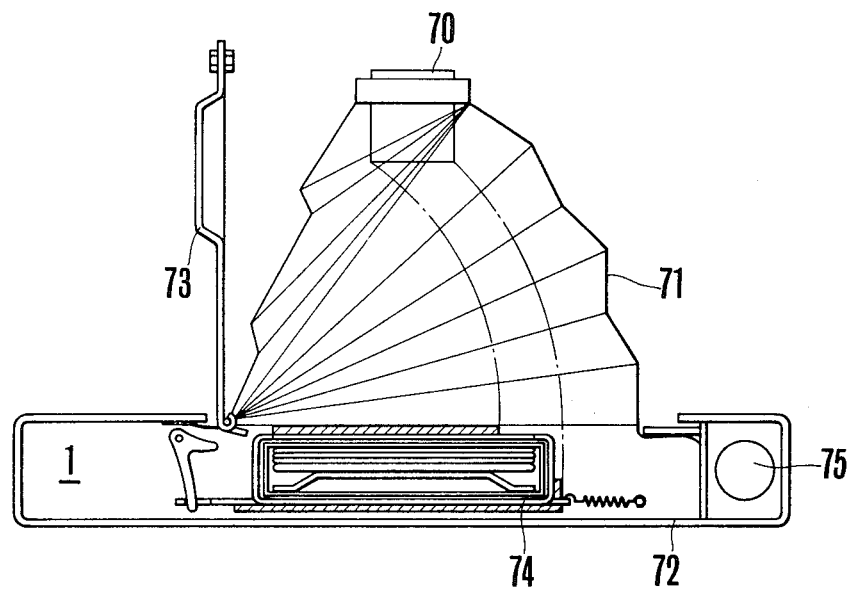
FIGS. 4a and 4b are partially sectioned side views showing a folding type instant camera in the extended and collapsed positions, respectively.
Figure 4B:
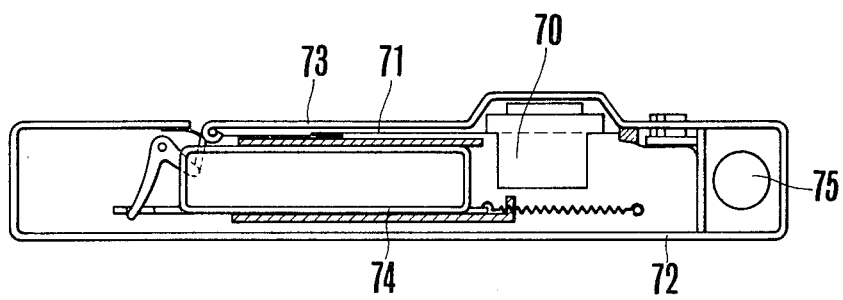

As shown in FIGS. 4a and 4b, a photo-taking optical system 70 is arranged on a bellows 71 assembled with a housing of a film magazine 74 so that when the camera is not in use the bellows 71 may be collapsed by manipulation of a cover 73 and brought into a closed position as shown in FIG. 4b. A spread roller assembly 75 is included for use in developing exposed film. The open or ready position of the camera is shown in FIG. 4a and as will be obvious from FIGS. 4a and 4b, it is of significant importance that the shape of the elements within which the optical system 70 is mounted be as thin as possible, with a rectangular form being particularly advantageous.

Figure 4C:
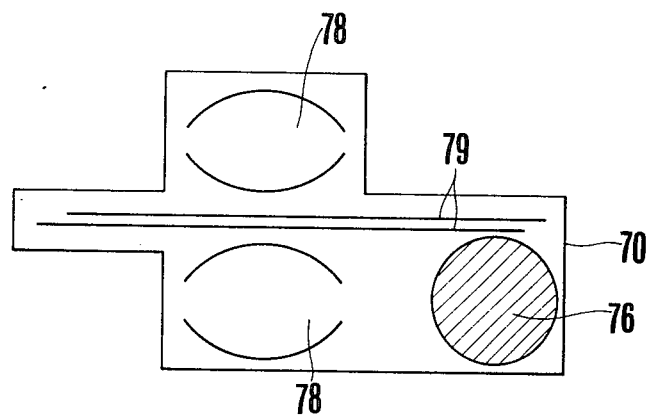
FIGS. 4c and 4d are schematic sectional views showing differences in efficiency of space utilization as between the devices of FIG. 1 and the devices of FIGS. 2a–l, respectively.
Figure 4D:
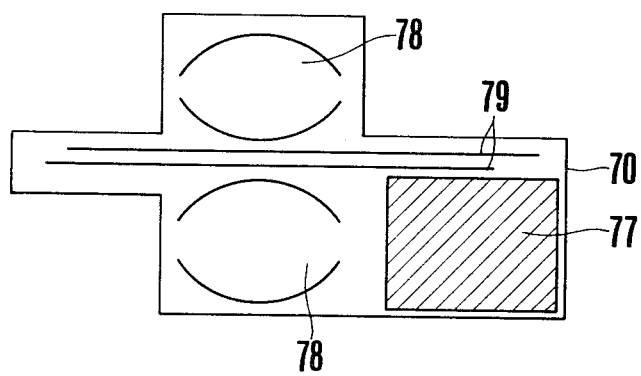

Accordingly, it will be noted that the electromagnetically driven shutter mechanism having the relatively thin rectangular construction depicted in FIG. 3 may be advantageously incorporated into the unit housing the optical lens system 70 shown in FIGS. 4a and 4b. The advantages of utilizing the present invention are perhaps more graphically apparent from the schematic diagrams of FIGS. 4c and 4d. If, for example, the unit 70 is shaped in the manner shown in FIG. 4c wherein a conventional round type of electromagnetic control device of the type depicted in FIG. 1 is utilized, it becomes impossible to fully utilize the space within which a device such as the control device 76 is to be arranged. However, in accordance with the present invention, a control device such as that indicated at 77 in FIG. 4d may be utilized to a greater advantage and with better efficiency from the point of view of space utilization. It will be noted that the devices of FIGS. 4c and 4d include shutter blades indicated at 79 and arranged in a space between front and rear lens groups 78.

Accordingly, it will be noted that the special configuration of the electromagnetic control device derived in accordance with the present invention provides a compact arangement which may be particularly advantageously utilized in a folding type of instant camera with the shutter operating more reliably and more accurately than would be otherwise possible with structures previously known. Although the present invention has been described in connection with an instant camera, it will be appreciated that the invention is, of course, applicable to many other commonly known types of cameras.

FIGS. 5a and 5b show a second embodiment of an electromagnetically actuated shutter mechanism employing the control device of the invention, particularly the configuration depicted in FIG. 2b. In FIG. 5a, the shutter is shown in the closed position. In FIG. 5b, the shutter is shown in a slightly open position, and similar reference numerals as those used in FIG. 3 are employed to denote similar parts with a detailed description of parts previously described being omitted. The lever 43 of FIG. 3 is also omitted but instead a pin 41 is directly coupled with the shutter blade 51 and with lever 46. By comparison with the embodiment of FIG. 3 where the lever 43 functions to increase the stroke, an increased torque is obtained with the modification of FIGS. 5a-b although the output of the electromagnetic control device A is the same.

FIG. 6 shows a third embodiment of a shutter mechanism employing control devices in accordance with the present invention and in FIG. 6 two control devices similar to the one depicted in FIG. 2b are utilized. The control devices, denoted A and B, are connected to respective shutter blades 51 and 52 through pins 41 and 41' of bobbin 31 and 31', respectively.

Furthermore, the blades 51 and 52 are biased by springs 81 and 83 for movement to the left and right, respectively, so that the shutter is held in the closed position. A linkage lever 84 is pivoted about a pivot axis 85 and includes pins 80 and 80' mounted on opposite ends of the lever 84 each engaging, respectively, a shutter blade 51 and 52. Accordingly, it will be seen that the shutter blades 51 and 52 are linked to each other.

Then the magnetic windings 40 and 40' are energized, the bobbin 31 will be driven rightwardly and the bobbin 31' will be driven leftwardly as a result of the electromagnetic action occurring in each of the control devices A and B. Thus, the shutter blades 51 and 52 will be actuated to move to the right and left, as indicated, against the forces of the springs 81 and 83. Thus, the openings in the shutter blades will be aligned with each other in order to initiate film exposure. When the degree of exposure has reached a predetermined level, the direction of current flow in the windings 41 and 41' will be reversed, by virtue of the mode of operation previously described in connection with FIG. 3, and the bobbins 31 and 31' will be moved in directions opposite to their original directions of motion. Thus, the shutter will be closed to terminate the exposure action.

Because of the use of paired flat rectangular electromagnetic control devices, the device of FIG. 6 is capable of producing a higher output while at the same time, because of the lack of intermediary devices between the electromagnetic control devices and the shutter blades, the embodiment is capable of increasing the speeds of the shutter blades 51 and 52 while maintaining output losses to minimum. Furthermore, the length of the pin 41 may be shortened to facilitate reduction of the thickness of the shutter unit 70. It should be noted in connection with the embodiments of FIGS. 3, 5a-b and 6 that the device of FIG. 2b may be replaced by any of the devices of FIGS. 2a, 2c, 2d and 2e with an equivalent result being achieved.

FIG. 7 depicts a fourth embodiment of the invention wherein an electromagnetically driven shutter assembly employing the control device in accordance with FIG. 2b is involved. In the embodiment of FIG. 7 the method utilized for guiding of the shutter blades is changed so that the blades will be subjected to a generally circular pattern of movement during their actuation. However, it should be noted that in FIG. 7, reference numerals similar to those of FIG. 3 have been utilized to denote similar parts.

In the device of FIG. 7, a third lever 150 is rotatably mounted on a pivot pin 154, and pins 151 and 152 are provided on opposite ends of the lever 150. The pins 151 and 152 are arranged to engage, respectively, shutter blades 52 and 51 in order to provide a guiding effect on the shutter blades. It should be noted that the shutter blades 51 and 52 are formed with openings 46a' and 52a', respectively which openings are formed as small round holes and not as elongated slots. The openings 46a' and 52a' are engaged respectively by pins 45 and 50. Thus, when the lever 46 is rotated, the action of the shutter blades will be such as to involve a circular mode of movement with the shutter being held or suspended on the levers 46 and 150. Since the ends of the levers 46 and 150 are rotating in a circular path of movement, and since these levers are engaged with the shutter blades 51 and 52 in a manner which imparts a circular type of motion to the blade, the blades will be moved accordingly. To achieve an almost constant rate of variation in the sizes of the shutter and auxiliary diaphragm openings 53'-54' and 55'-56', the shapes of the openings 53' and 54' and the cutouts 55' and 56' are modified as compared with those of FIG. 3. The merits of a circular-motion type of shutter blade assembly is that the loss in power which would otherwise be caused by frictional forces exerted between the pin 50 and the slot 52a of FIG. 3 may be minimized.

Figure 8:
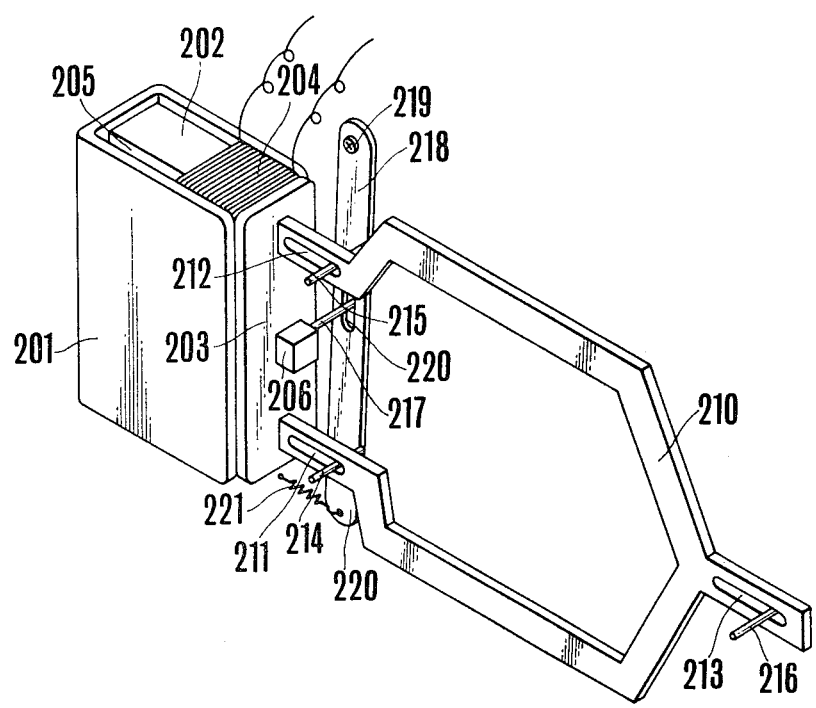

In FIG. 8 there is shown a sixth example of the present invention wherein an electromagnetic shutter drive mechanism in accordance with the invention is employed. An electromagnetic control device comprises a yoke 201 having a U-shaped configuration, with a permanent magnet 202 being fixedly mounted on the bottom of the yoke 201 with an associated pole piece (not shown). The device also includes a rectangular hollow bobbin 203, a magnetic winding 204 about the bobbin 203 and an air gap 205 being defined between the permanent magnet 202 and pole piece with magnetic flux being produced in the gap 205 by the permanent magnet 202.

The bobbin 203 is supported by the U-shaped member 210 with the member 210 being provided with three longitudinally elongated slots 211, 212 and 213 within which there are engaged respective guide pins 214, 215 and 216, which pins are fixedly mounted on the camera housing (not shown). A lever 218, constituting part of the motion transmitting mechanism, is rotatably mounted on a pivot pin 219 and a slot 220 is formed therein at the center of the lever 218. A pin 217 extends from a projection 206 on the bobbin 203 into the slot 220. A spring 221 is connected between the free end of the lever 218 and a pin on the camera housing in order to urge both of the shutter blades (not shown) of the shutter assembly in the direction toward the closed position.

Figure 9:
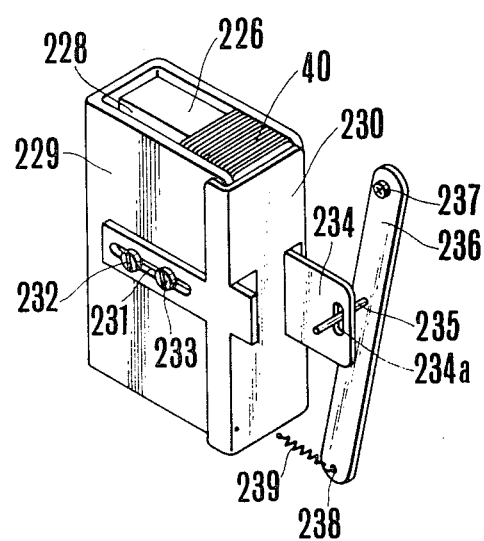

A seventh example of a rectangular bobbin type electromagnetic control device in accordance with the present invention is shown in FIG. 9. The embodiment of FIG. 9 comprises a yoke 229 of U-shaped cross section with a permanent magnet 226 being fixedly secured to the bottom face thereof. The permanent magnet includes a pole piece fixedly secured thereto, with a rectangular hollow bobbin 230 having a magnetic winding 40 also being provided. In a gap 228 defined between the yoke 229 and the permanent magnet 226, a magnetic flux is produced by the permanent magnet. The bobbin 230 is formed with an extension piece which extends alongside the yoke 229, with this extension piece being provided with an elongated slot 231. A pair of guide pins 232 and 233 fixedly mounted on the yoke 229 are engaged within the slot 231 in order to support the bobbin 230. A lever 236 is rotatably mounted on a pivot pin 237 in order to transmit motion of the bobbin 230 to the shutter blades through a pin-and-slot connection 235, 234a. The free end of the lever 236 is connected to a bias spring 239. It should be noted that the devices in accordance with FIGS. 8 and 9 are responsive to current supplied from an exposure control circuit in a manner similar to that described in connection with the devices of FIGS. 2a–2e but differ from the latter in that the guide means for the bobbin may be constructed in a different form.

Figure 10:
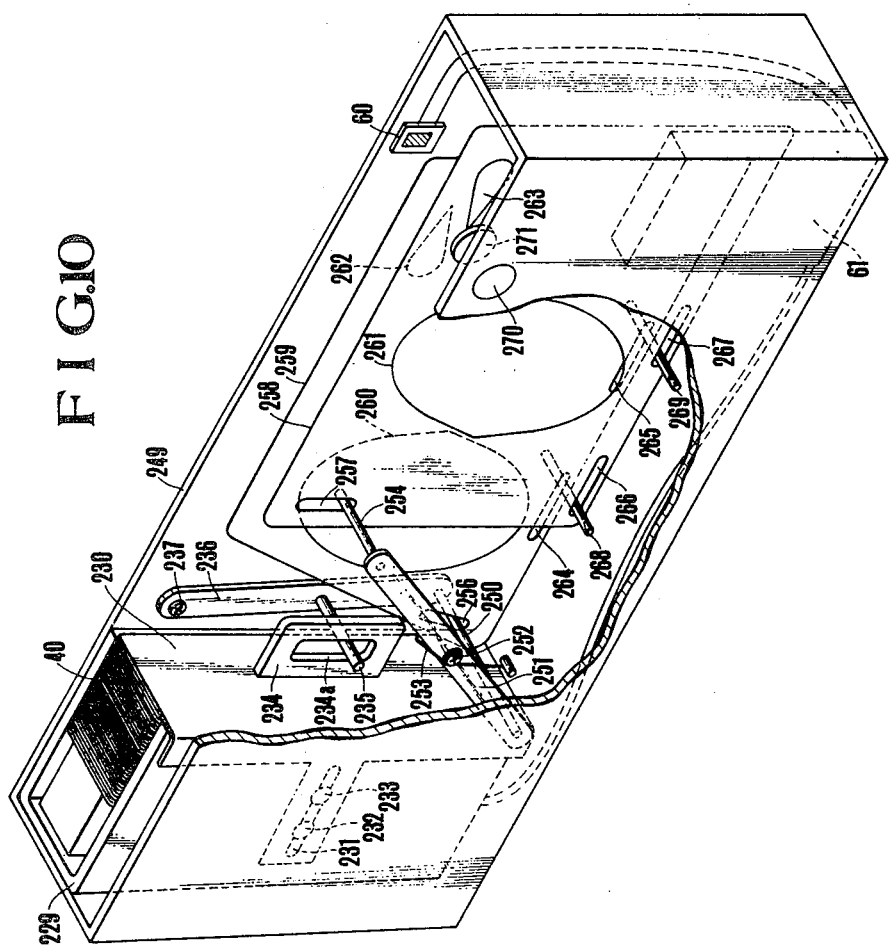
FIG. 10 is a perspective view of a fourth embodiment of the invention employing the device of FIG. 9 in a casing shown with parts broken away to illustrate details of shutter blades and drive means utilized therein.

FIG. 10 depicts a fourth embodiment of an electromagnetically driven shutter device employing the control device of FIG. 9. In the embodiment of FIG. 10, the electromagnetic control device and the shutter mechanism are fabricated in a single unit so as to position the device in a corner of the unit housing. With such an assembly, because of the electromagnetic type of drive for the shutter, there is no need to provide a mechanical linkage between the shutter unit and the camera body and only an electrical connection is required. Thus, the assembly technique and overall structure of the device are simplified.

In FIG. 10, the references 229 to 237 denote parts similar to those shown in FIG. 8. The yoke 229 and the pivot pin 237 are fixedly mounted on the internal face of the unit housing 249. The free end of the first lever 236 is connected through a pin 250 to one arm of a second lever 251 which is rotatably mounted on a pivot pin 252, with the opposite end of the lever 251 being engaged with a front shutter blade 258 through a pin 254. The second lever 251 is biased by a spring 253 toward rotation in a clockwise direction. This spring is the practical equivalent of the spring 239 of FIG. 9 which may be omitted when spring 253 is provided. The shutter blades 258 and 259 are formed with exposure openings 260 and 261 and with light metering cutouts 262, 263. In the corners of the shutter blades 258, 259 there are shown slots 256, 257 within which pins 250, 254 are engaged. The front shutter blades 258 is further provided with a pair of longitudinally elongated slots 266, 267 within which respective guide pins 268, 269 are engaged.

The rear shutter blade 259 is also provided with a pair of longitudinally elongated slots 264, 265 within which the common guide pins 268, 269 are engaged. A light metering system comprises a round opening 270 formed in the front panel of the unit housing 249 and a condenser lens 271 by means of which an image of an object to be photographed may be focused on the image-receiving surface of a photosensitive element 60. The output of the photosensitive element 60 is processed by a circuit 61 to control the period of actuation of the magnetic control device.

Figure 11:
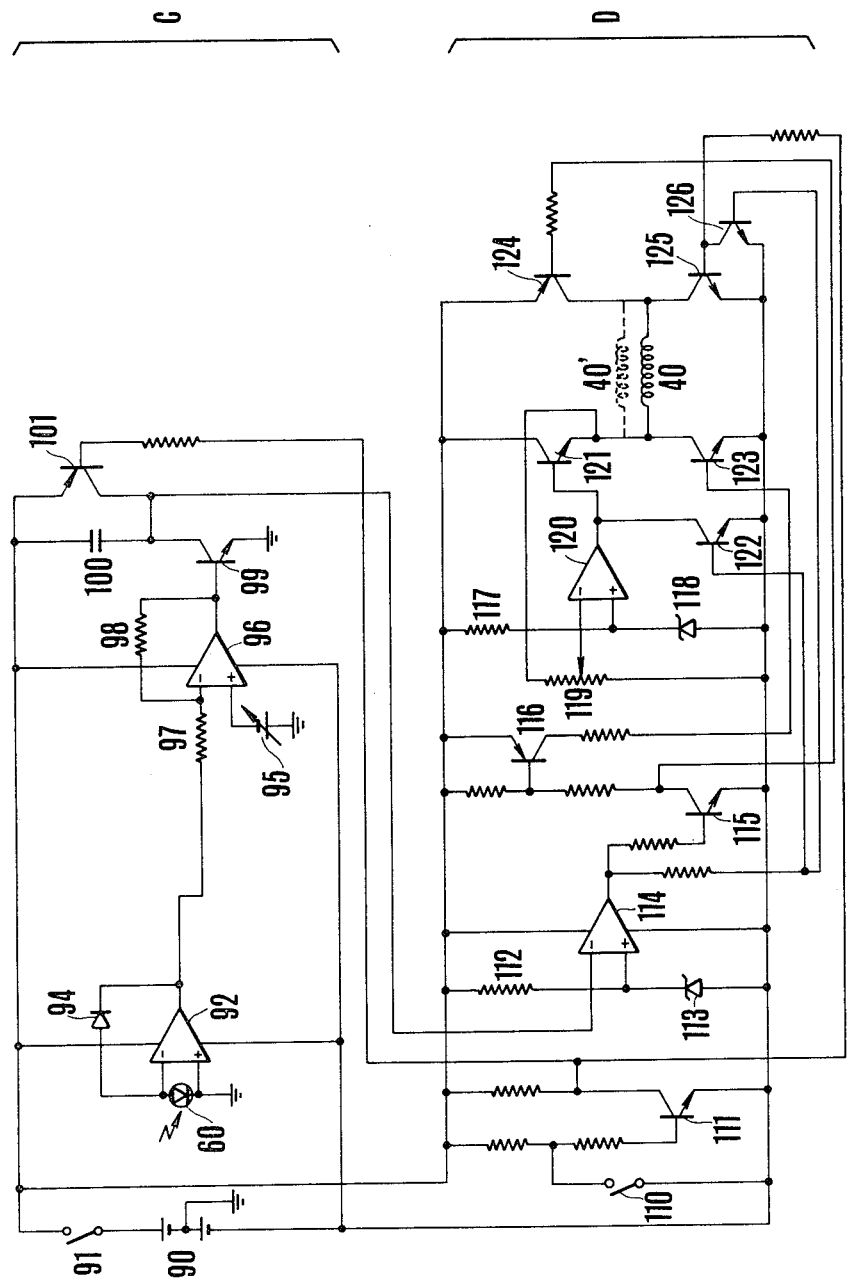
FIG. 11 is an electrical circuit diagram of the electromagnetic control devices of FIGS. 3, 5a–b, 6, 7 and 10.

Referring to FIG. 11 there is shown in some detail the circuit 61 previously mentioned in connection with FIGS. 3, 5a–b, 6, 7 and 9. The circuit 61 comprises a light metering circuit C and a shutter control circuit D. The light metering circuit C includes an electrical power source or battery 90, a main switch 91, the photosensitive element 60 which in this instance is a silicon photocell (SPC) connected across two inputs of an operational amplifier 92, and a log diode 94 connected in a negative feed back network to the operational amplifier 92 to constitute a so-called "SPC amplifier". The output of the operational amplifier 92 is connected through a resistor 97 to an inversion input of an operational amplifier 96 which constitutes an inversion amplifier together with the resistors 97 and a resistor 98, and which has a noninversion input connected to an output of a film speed setting variable voltage source 95. The output of the operational amplifier 96 is connected to a base of a logarithmic extension transistor 99, with the collector of transistor 99 being connected to a timing capacitor 100 and with the emitter being connected to ground.

The circuit C further includes a switching transistor 101 having its emitter connected to a positive terminal of the battery 90 through the switch 91, with the collector of transistor 101 being connected to the timing capacitor 100 and with the transistor base being connected to the circuit D.

The circuit D includes a switch 110 arranged to be closed when a shutter button (not shown) is depressed. The circuit also includes a switching transistor 111 with its collector connected to the base of the transistor 101 through a resistor, and an operational amplifier 114 which constitutes a comparator having a noninversion input connected to a constant voltage source of a resistor 112 and a zener diode 113 and having an inversion input connected to the collector of the transistor 101. The output of the operational amplifier 114 is connected to switching transistors 115, 122 and 126 at the bases thereof. A switching transistor 116 has its base connected to the collector of the switching transistor 115.

The circuit D further includes a constant voltage circuit composed of an operational amplifier 120 and a transistor 121. Applied to the noninversion input of the operational amplifier is a constant voltage from a point on a connection between a resistor 117 and a zener diode 118. The inversion input of the operational amplifier 120 is connected to a tap of a variable resistor 119 between the negative terminal of the battery 90 and the emitter of a transistor 121 so that, upon variation of the output of the variable resistor 119, the emitter potential of the transistor 121 is varied. Three additional switching transistors 123, 124 and 125 have their bases connected, respectively, to the collectors of the switching transistors 116, 115 and 111 through respective resistors. The aforesaid magnetic winding 40 is connected at one end thereof to a point between the switching transistors 121 and 123 and at the other to a point between the transistors 124 and 125.

In the operation of the circuit of FIG. 11, when the main switch 91 is closed, since the release switch 110 is open, the switching transistor 111 will be turned ON to produce a low level voltage at its collector thereby causing the switching transistor 101 to be turned ON. A potential of high level then appears at the collector of the transistor 101 and as a result charging of the timing capacitor 100 is impeded. Therefore, the comparator 114 produces an output voltage of low level whereby the switching transistors 115, 122 and 126 are turned OFF. Because of the nonconducting state of the transistor 115, the switching transistor 116 is OFF and therefore the switching transistor 123 is also OFF. Again, the switching transistor 124 is OFF because of the nonconducting state of the transistor 115 and the switching transistor 125 is also OFF because of the low level of collector potential at the switching transistor 111. Although the transistor 121 is in the conducting state, since the other transistors 123, 124 and 125 are in the nonconducting state, no current flows through the magnetic winding 40 and the electromagnetic control device remains inactive with the shutter in the closed position.

When the shutter button is depressed in order to close the switch 110, the switching transistor 111 is turned OFF with increase in its collector potential causing transistor 125 to be turned ON. Therefore, current flows through the transistor 121, winding 40 and transistor 125. Thus, the electromagnetic control device is actuated and the shutter blades are actuated to initiate exposure of the film. As the size of the diaphragm opening in front of the SPC 60 is increased with time, the operational amplifier 92 produces an output voltage with a magnitude proportional to the logarithm of the integrated amount of light incident upon the photosensitive elements 60. This output is combined with information of ASA sensitivity of the film being used from the variable voltage source 95 in the operational amplifier 96. The output of the operational amplifier 96 is then extended logarithmically by the transistor 99 so that the intensity of current flowing through the transistor 99 is proportional to the level of brightness of an object to be photographed. Since the switching transistor 111 is turned OFF by the actuation of the shutter button, the transistor 101 is set into the nonconducting state. Therefore, the timing capacitor 100 is charged through the transistor 99. When a predetermined low level potential is attained at the collector of the transistor 99, the operational amplifier 114 constituting the comparator changes its output from a low to a high level whereby the switching transistors 115, 122 and 126 become conductive. When the switching transistor 115 is rendered conductive, the switching transistor 123 is, in turn, also rendered conductive. Additionally, switching to the conductive state of the switching transistor 122 causes nonconduction of the switching transistor 121 which in turn causes the switching transistor 125 to be rendered nonconductive. Thus, the direction of current flowing through the magnetic winding 40 is reversed so that the shutter blades are driven to move to the closed position.

It will be appreciated from the foregoing that when the shutter is driven for movement in the forward direction, the predetermined output voltage of the transistor 121 controls the rate of energization of the winding 40. However, when driven in the reverse direction, the full voltage of the battery 90 is applied to the winding 40 to speed the closing operation of the shutter. In the case of an embodiment according to FIG. 6 where two electromagnetic control devices are employed, the additional winding may be connected as indicated in phantom line at 40'. As has been described in detail, an electromagnetic control device in accordance with the present invention may be formed with a generally rectangular construction which will be found to be much more amenable to incorporation in a camera with the advantages attained being by several degrees improved over conventional round types of devices. Thus, there is provided an advantage with regard to increasing the space factor of the device.

Furthermore, although the present invention has been described in connection with a moving coil type of electromagnetic control device, it is to be understood that the invention is not confined to this type of device but should be considered applicable to the moving magnet type and plunger type of electromagnetic control device.

While specific embodiments of the invention have been shown and described in detail to illustrate the application of the inventive principles, it will be understood that the invention may be embodied otherwise without departing from such principles.

What is claimed is:

1. An electromagnetic control device including:
 a hollow yoke having a rectangular configuration defining an internal space;
 a permanent magnet fixedly mounted in said internal space of said yoke;
 a pole piece fixedly mounted on said permanent magnet;
 an air gap defined between an internal surface of said yoke and said pole piece within which a magnetic flux is produced by said permanent magnet;
 a first guide member mounted on said pole piece;
 a second guide member mounted on said yoke;
 a hollow bobbin having a rectangular configuration and having first and second guide receivers thereon, said first and second guide receivers operating to receive in engagement therewith said first and said second guide members, respectively, to effect guided movement of said bobbin within said air gap; and
 a coil surrounding said bobbin, energization of said coil operating through interaction with said magnetic flux in said air gap to effect guided movement of said bobbin by interengagement between said first and said second guide members with said first and said second guide receivers, respectively.

2. A device according to claim 1 wherein said yoke is formed with a U-shaped configuration.

3. A device according to claim 2 wherein said bobbin comprises a lower framework panel having four corners, said bobbin being provided with four lugs located one at each of said four corners to abut against the internal surface of said yoke along the side edges thereof.

4. An electromagnetic control device comprising:
a hollow yoke having a rectangular configuration defining an internal space;
a permanent magnet fixedly mounted in said internal space of said yoke;
an air gap defined between an internal surface of said yoke and said permanent magnet within which a magnetic flux is produced by said permanent magnet;
a hollow bobbin having a rectangular configuration and arranged for movement within said air gap;
first guide means positioned between said permanent magnet and said bobbin to regulate movement of said bobbin within said air gap;
second guide means positioned between said yoke and said bobbin to prevent said bobbin from being displaced from its defined path of movement within said air gap; and
a coil surrounding said bobbin, energization of said coil operating through interaction with said magnetic flux in said air gap to effect movement of said bobbin, said movement being guided by interengagement between said first and said second guide means.

5. An electromagnetic control device comprising:
a hollow yoke having a rectangular configuration defining an internal space;
a permanent magnet fixedly mounted within said internal space of said yoke;
an air gap defined between an internal surface of said yoke and said permanent magnet within which a magnetic flux is produced by said permanent magnet;
a hollow bobbin having a rectangular configuration and arranged for movement within said air gap;
first guide means positioned between said permanent magnet and said bobbin to regulate movement of said bobbin;
second guide means positioned between said yoke and said bobbin to prevent said bobbin from being displaced from its defined path of movement within said air gap;
a shutter mechanism;
a shutter drive member cooperating with said bobbin to open and close said shutter mechanism;
a coil surrounding said bobbin, energization of said coil operating through interaction with said magnetic flux in said air gap to effect movement of said bobbin, said movement being guided by interengagement between said first and said second guide means; and
exposure control means connected with said coil to control power supply to said coil.

6. A device according to claim 5 including a unit housing within which the entire body of said electromagnetic control device, including said yoke, said permanent magnet, said first and second bobbin and said guide means, is contained in an operatively effective arrangement to impart to said device a generally flat rectangular construction.

7. A device according to claim 5 wherein said exposure control means comprise:
first switching means for effecting current flow through said coil in one direction;
second switching means for effecting current flow through said flow in an opposite direction;
third switching means responsive to a release operation for actuating said first switching means;
light measuring means for measuring the brightness of an object to be photographed; and
detecting means for detecting the attainment by said light measuring means of a predetermined output level to actuate said second switching means and to deactuate said first switching means.

8. A device according to claim 7 wherein said bobbin is adapted to move outwardly relative to said yoke and also to be retracted thereinto, said bobbin when moved outwardly from said yoke acting to open said shutter mechanism and when retracted into said yoke acting to close said shutter mechanism with current flow through said coil in one direction effecting driving movement of said bobbin outwardly from said yoke and with current flow through said coil in an opposite direction operating to drive said bobbin to be retracted into said yoke.

9. An electromagnetically driven shutter assembly for a camera comprising:
a first electromagnetic control device comprising
a first hollow yoke having a rectangular configuration defining an internal space,
a first permanent magnet fixedly mounted in said internal space of said first yoke,
a first air gap defined between an internal surface of said first yoke and said first permanent magnet within which a magnetic flux is produced by said permanent magnet,
a first hollow bobbin having a rectangular configuration inserted into said first air gap,
first guide means positioned between said first permanent magnet and said first bobbin operating to regulate the direction of movement of said first bobbin in said air gap,
second guide means positioned between said first yoke and said first bobbin to prevent said first bobbin from being displaced from its defined path of movement within said air gap, and
a first coil surrounding said bobbin, energization of said first coil operating through interaction with said magnetic flux in said first air gap to effect movement of said first bobbin, said movement being guided by interengagement between said first and said second guide means;
a second electromagnetic control device positioned opposite to said first electromagnetic control device, said second device comprising
a second hollow yoke having a rectangular configuration defining an internal space,
a second permanent magnet fixedly mounted in said internal space of said second yoke,
a second air gap defined between an internal surface of said second yoke and said second permanent magnet within which a magnetic flux is produced by said second permanent magnet,
a second hollow bobbin having a rectangular configuration inserted into said second air gap,
third guide means positioned between said second permanent magnet and said second bobbin to regulate the direction of movement of second bobbin within said air gap, fourth guide means positioned between said second yoke and said second bobbin to prevent said bobbin from being displaced from its defined path of movement within said air gap, and a second coil surrounding said second bobbin, energization of said second coil operating through interaction with said magnetic flux in said second air gap to effect movement of said second bobbin, said movement being guided by interengagement between said third and said fourth guide means;

a first shutter member defining a first opening, said first shutter member being arranged in operative cooperation with said first bobbin;

a second shutter member defining a second opening, said first and said second openings together defining a shutter opening for said camera, said second shutter member being arranged in operative cooperation with said second bobbin; and control means for effecting controlled electrical power supply to said first and said second coils, said control means being responsive to a release actuation to supply to said first and said second coils current flow in one direction to effect movement of said first and said second bobbins to drive said first and said second shutter members to open said shutter opening, said control means also being effective after a time interval dependent upon the object brightness of an object to be photographed to supply to said first and said second coils current flow in an opposite direction thereby to effect movement of said first and said second bobbins to drive said first and said second shutter members to close said shutter opening.

* * * * *